No. 639,730. Patented Dec. 26, 1899.
D. H. HOUSTON.
MAGAZINE CAMERA.
(Application filed Feb. 27, 1899.)

(No Model.)

Witnesses.
R. A. Balderson
A. M. Long

Inventor.
David Henderson Houston

UNITED STATES PATENT OFFICE.

DAVID HENDERSON HOUSTON, OF HUNTER, NORTH DAKOTA.

MAGAZINE-CAMERA.

SPECIFICATION forming part of Letters Patent No. 639,730, dated December 26, 1899.

Application filed February 27, 1899. Serial No. 706,951. (No model.)

*To all whom it may concern:*

Be it known that I, DAVID HENDERSON HOUSTON, a citizen of the United States, residing at Hunter, in the county of Cass and State of North Dakota, have invented certain new and useful Improvements in Photographic Cameras; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to photographic cameras, and has for its object the provision of a camera adapted to use cut sensitized films or thin flexible plates, such as celluloid plates sensitized for photographic purposes, said films or thin plates having an opaque backing impenetrable to the rays of light coming through the lens of the camera, and thus adapted to receive an impression in the sensitized surface of the plates, and the opaque backing on the plates adapted to confine the action of the light to the sensitized surface of the first plate in the plate-magazine of the camera.

My invention consists in novel features of construction and combination of parts, which are hereinafter fully described, and the novel features pointed out in the claims at the end of this specification.

Figure 1:
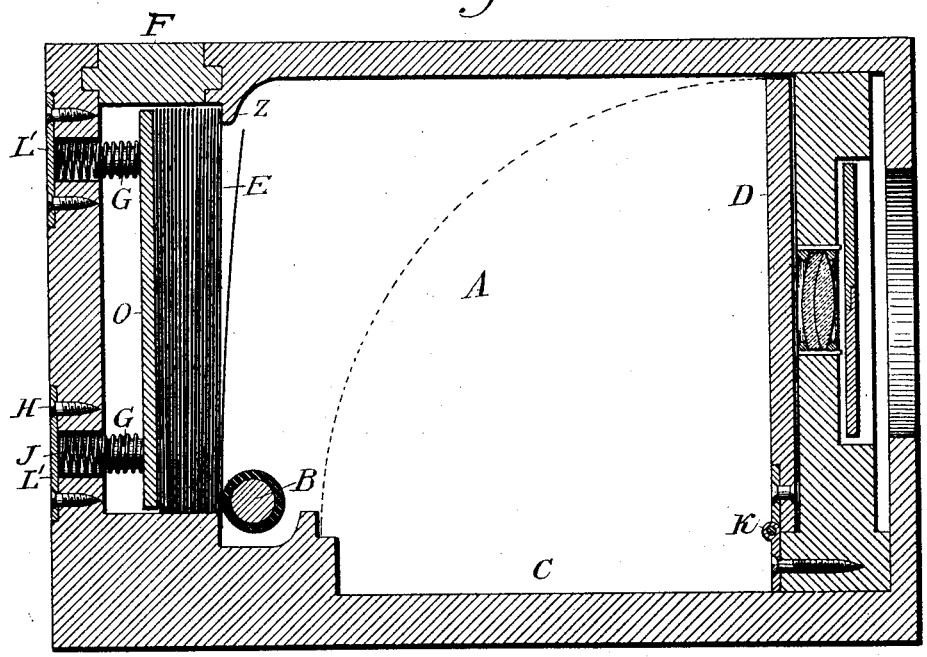
Figure 2:
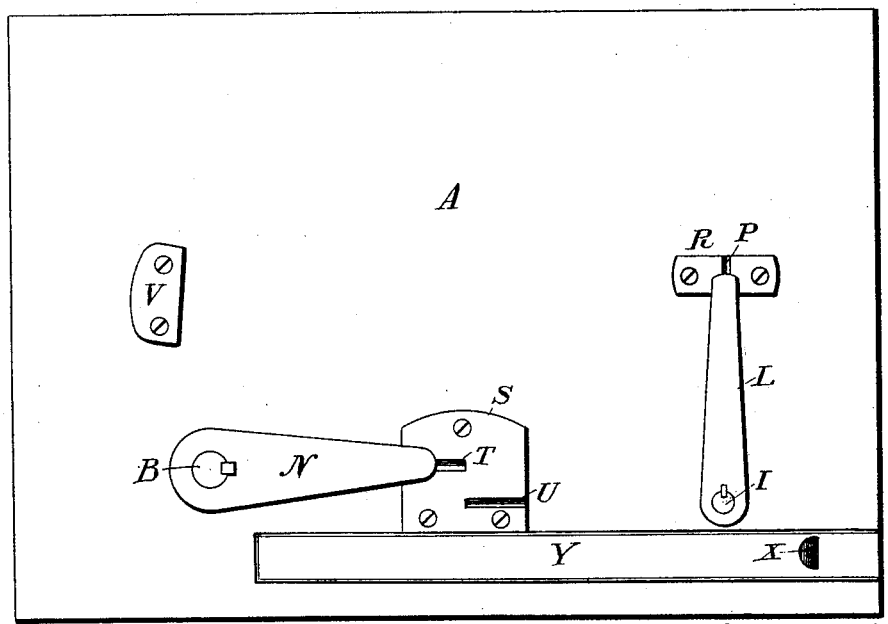

In the drawings, Figure 1 is a longitudinal sectional view of the complete camera, and Fig. 2 a side elevation view of the camera.

In the drawings, in which similar letters of reference denote corresponding parts in both figures, A in Fig. 2 represents a side view of the camera and showing the outside working handles and their stops and also the slide that closes the outlet of the plate-box of the camera. In Fig. 2 a friction roller-shaft B is shown, having a handle N held by a point thereon entered into a groove T in the plate S, and the said friction roller-shaft B in Fig. 2 is a continuation through the side of the camera-case of the same shaft B, as shown in Fig. 1. In Fig. 2 there is also a shaft I, shown having a handle L held by a point thereon entered into a groove P in the plate R, and the said shaft I passes through the side of the camera-case and is attached to the axis of the plate-box cover D in alinement with the hinge K. In Fig. 2 may be seen the sliding cover Y of the outlet of the plate-box C, said sliding cover having a thumb-notch X. In Fig. 2 may be seen the stop V for the handle N.

In Fig. 1 may be seen the pack of plates E and the first plate of the pack released at its top side from the plate-rest Z, and in the magazine-box there is placed a movable back O, having lugs G G, said lugs supporting springs J, said springs contained also within holes in the back of the camera-case at J and held in by the plates L'. In Fig. 1 is shown a light-tight sliding cover F, covering the plate-magazine in a light-tight manner. In Fig. 1 is shown the pack of plates E, said pack of plates resting at their top against the plate-rest Z and resting at their bottom against the friction-roller B, said friction-roller composed of a center shaft of hard material covered over by a rubber surface, preferably a rubber pipe forced over the hard center shaft. In Fig. 1 is shown a swinging cover D of the plate-box C, said swinging cover having its axes on the hinge K and closable over the plate-box C.

In preparing the camera for use the operator having placed a pack of sensitized films having opaque backs into the magazine of the camera and through the aperture caused by removing the cover F and having placed the pack of films sensitized sides all forward and the whole pack before the movable back O the springs pressing on the movable back will cause the films to rest at their top sides against the plate-rest Z and at their bottom sides on the bottom of the interior of the magazine part of the camera and also against the friction-roller B, and having replaced the cover F and turned down the handle L to the notch U the camera is prepared ready to be used, and which is accomplished in the following manner: First, make the exposure by the shutter in the usual way; second, turn up the handle L to the notch P in the plate R; third, turn up the handle N from the notch T to the stop V, which will draw down the first plate in the magazine, and thereby free the top of the first plate from the plate-rest Z; fourth, holding the camera bottom down and front end forty-five degrees lower than the back end, then give the handle N a quick movement back to the notch T, which will throw the plate or film into the plate-box C; fifth, lower the handle L to the notch U, which will inclose the plate into the plate-box C, and the camera is again ready for use.

I claim—

1. Combined in a camera, a case, the movable back in the magazine, said movable back adjusted on springs, the cover of the magazine, a friction-roller adjusted to rest against the lower part of the side of the first plate in the magazine, the interior of the case having a pit below the said first plate, whereby the said friction-roller can pull down the said first plate of the magazine to a position below that of the other plates in the magazine.

2. Combined in a camera, a case, a friction-roller placed to bear against the side of the first plate in the camera-magazine, said friction-roller having a core of hard material, and said core of hard material inserted into a piece of rubber pipe, and of the camera-case having a recess adapted to allow the first plate to pass from the position of the other plates in the magazine.

3. Combined in a camera, a case, a magazine having a closable aperture adapted to allow access to the said magazine, the movable back in the magazine, said movable back adjusted to spring, a friction-roller adjusted to rest against one side of the first plate in the magazine, said friction-roller having its axis passing through one side of the camera-case, a handle on the said axis, the camera-case having an interior recess adapted to allow the first plate in the magazine to move from its position sufficiently to allow the opposite side of the said first plate to be free from the plate-rest, the camera-case having a closable aperture connecting with the plate-box, said plate-box located in the interior of the camera, the adjustable swinging cover of the said plate-box, said adjustable swinging cover having its axis at its front edge, said axis of said swinging cover passing through the side of the camera-case, a handle on the said axis of the said swinging cover, and of a lens and shutter fitted to the camera.

4. Combined in a camera, a case, a magazine having a closable aperture adapted to allow access to the said magazine, a movable back in the magazine, said movable back adjusted to spring, a friction-roller adjusted to rest against one side of the first plate in the magazine, said friction-roller having its axis passing through one side of the camera-case, a handle on the said axis, the camera-case having an interior recess adapted to allow the first plate in the magazine to move from its position sufficiently to allow the opposite side of the said first plate to be free from the plate-rest, the camera-case having a closable aperture adapted to allow access to the exposed plates.

In testimony whereof I affix my signature in presence of two witnesses.

DAVID HENDERSON HOUSTON.

Witnesses:
GEO. M. COPENHAVER,
WM. H. DE LACY.